United States Patent [19]
Ellis et al.

[11] Patent Number: 5,497,371
[45] Date of Patent: Mar. 5, 1996

[54] DIGITAL TELECOMMUNICATION LINK FOR EFFICIENTLY TRANSPORTING MIXED CLASSES OF PACKETS

[75] Inventors: John G. Ellis; Keith C. Dysart, both of Kanata; Douglas N. Commons, Ottawa, all of Canada

[73] Assignee: Northern Telecom Limited, Montreal, Canada

[21] Appl. No.: 389,449

[22] Filed: Feb. 16, 1995

Related U.S. Application Data

[63] Continuation of Ser. No. 141,007, Oct. 26, 1993, abandoned.
[51] Int. Cl.$^6$ .................................................... H04L 12/56
[52] U.S. Cl. ............................ 370/60; 370/61; 370/79; 370/85.1; 370/85.6; 370/100.1; 371/30; 371/48
[58] Field of Search ................... 370/60, 61, 79, 370/85.1, 85.6, 58.2, 58.3, 110.1, 100.1; 371/48, 52, 53, 54, 30

[56] References Cited

U.S. PATENT DOCUMENTS

| | | | |
|---|---|---|---|
| 4,542,380 | 9/1985 | Beckner et al. | 370/61 |
| 4,707,831 | 11/1987 | Weir et al. | 370/94 |
| 4,914,650 | 4/1990 | Sriram | 370/60 |
| 4,942,569 | 7/1990 | Maeno | 370/60 |

FOREIGN PATENT DOCUMENTS

| | | | |
|---|---|---|---|
| 0179629 | 4/1986 | European Pat. Off. | H04L 11/20 |
| 0234859 | 9/1987 | European Pat. Off. | H04L 11/20 |
| 0276349 | 8/1988 | European Pat. Off. | H04L 11/20 |
| 0320772 | 6/1989 | European Pat. Off. | H04L 11/20 |
| 0435046 | 7/1991 | European Pat. Off. | H04L 12/56 |
| WO93/01670 | 1/1993 | WIPO | H04L 12/56 |

OTHER PUBLICATIONS

"Design of a Hybrid Transfer Mode Broadband ISDN", Xinyi Liu and H. T. Mouftah, IEEE Int'l Conference on Communications ICC '90, Incl. Supercomm Technical Sessions, Apr. 15–19, 1990, pp. 315.1.1–315.1.5.

"A Shared Medium Multi-Service Protocol", M. Zukerman, P. Potter, L. Wedding, and L. Yao, IEEE Int'l Conference on Communications ICC '93, May 23–26, 1993, Geneva, pp. 1000–1004.

"Shared Buffer Memory Switch for an ATM Exchange", N. Endo, T. Kozaki, T. Ohuchi, H. Kuwahara and S. Gohara, IEEE Trans on Communications 41, No. 1, Jan. 1993, pp. 237–245.

*Primary Examiner*—Douglas W. Olms
*Assistant Examiner*—Russell W. Blum
*Attorney, Agent, or Firm*—Yoshiharu Toyooka

[57] ABSTRACT

An efficient packet transport system for mixed traffic in which a packet fragmentation protocol allows traffic of different classes to occupy a single physical link. In one embodiment, packet fragmentation gives delay sensitive traffic priority over non-sensitive traffic. This allows both traffic types to coexist on a single data link. The protocol eliminates software overheads associated with mis-ordered packets and efficiently transports both cell and frame formatted data using encapsulation.

7 Claims, 4 Drawing Sheets

Protocol Diagram
N x 8

N = the number of bytes in the payload

| Flag | P | SEQ No. | C | CRC | Flag |
|---|---|---|---|---|---|
| 8 | 1 | 4 | 1 | 0, 16, 32 | 8 |

Payload, (Address, Control, data)

DIGITAL TELECOMMUNICATION LINK FOR EFFICIENTLY TRANSPORTING MIXED CLASSES OF PACKETS

This is a continuation of application Ser. No. 08/141,007, filed 26 Oct. 1993, now abandoned.

FIELD OF THE INVENTION

This invention relates generally to high speed transmission of digital data in packets from one node to another. In particular, the invention is directed to a novel transmission technique by which digital data of different classes can be effectively transmitted through a single link.

BACKGROUND OF THE INVENTION

Multimedia is being touted as telecommunications of the future. Telecommunication networks are required to handle a variety of traffic such as voice, video, data etc.; in other words, the bandwidth must be shared by many different classes of traffic. However, different classes of traffic call for different qualities of service from the network, with respect to, for example, speed of transmission, probability of transmission error, network delay etc. As for the network delay, interactive data, voice and video traffic are delay sensitive and sensitivity is characterized by full duplex operation where users expect timely service. Considering the consequences of slow turn-around on customer satisfaction, slow interactive operations are deemed to be inadequate. Non-delay-sensitive traffic includes bulk down-load, non-real time video. This traffic can sustain relatively large delays because the end users don't see the delay. Typically, these services are simplex and delay is transparent to the user.

ATM and Fast Packet switching architectures are being proposed for integrated switching applications. These broadband technologies are characterized by cell switched data. The main advantage of cell switching is that it minimizes switching delays caused by voice/video/data interactions and it is suitable for hardware accelerated routing. Cell switching provides a predictable and controllable delay. Long data packets do not adversely interfere with delay sensitive voice packets.

Cell switching provides a connection oriented routing algorithm which prevents packet mis-ordering. By establishing an explicit path, cells are guaranteed to arrive in sequence. Under normal circumstances, all cells associated with a connection follow an explicit path.

Cell switching effectively solves the emission delay and sequencing problem for connection oriented services, however, it is not well suited to connectionless data services. Packet switching connectionless data services over a broadband cell switch results in out of sequence cells due to multi-path delay variance. The re-assembly of out of sequence cells into packets poses a significant processing requirement on the network end stations. Furthermore, the transport of large (10–20 Kbyte) data packets requires processor intensive packet fragmentation into cells and re-assembly of cells into packets.

In the past, bandwidth sharing schemes have been proposed for integrated packet switching over a switching network. One scheme for an integrated voice and data network is described in U.S. Pat. No. 4,914,650, issued on Apr. 3, 1990 to Sriram. This network has a multiplexer arranged with a voice queue for storing received voice packets and a data queue for storing received data packets. Voice packets are transmitted for a predetermined interval T1 and data packets are transmitted for a predetermined interval T2. Predetermined intervals T1 and T2 may be of different duration. The multiplexer may be additionally arranged with a separate signaling queue for storing received signaling messages. If a signaling message is moved into the separate signaling queue during either interval T1 or T2, that interval is suspended and transmission of voice or data packets is interrupted from the end of a packet until the signaling message is transmitted. Then transmission of the interrupted voice or data packets is resumed for the remainder of the suspended interval T1 or T2.

The Sriram patent also states that alternatively a multiplexer may be arranged with a separate signaling queue for storing received signaling messages at any time. Signaling message transmission intervals are reserved either between intervals T1 and T2, between intervals T2 and T1, or both. These signaling intervals are of a flexible duration that is sufficiently long for transmitting all of the signaling messages waiting to be transmitted. The multiplexer allocates a certain minimum bandwidth for voice and data traffic. This protects each type of traffic from congestion caused by the other type. Concurrently, the multiplexer also allocates to each type of traffic any spare bandwidth momentarily available because it is not being utilized by the other type of traffic. Signaling messages are serviced with very low delay and zero packet loss.

In U.S. Pat. No. 4,707,831, issued Nov. 17, 1987 to Weir et al, an electrical intelligence transmission system is described. In the system, both speech and data are transmitted as packets over virtual connections set up in a fully digital network, the speech and data packets being transmitted at the bit rate of the transmission medium in which speech packets have priority over data packets. If a speech packet is detected during the transmission of a data packet, the transmission of that data packet is interrupted to allow the speech packet to be conveyed over the transmission medium, and when the medium again becomes free of speech, the non-transmitted part of the interrupted data packet is transmitted as a separate packet.

In the system of Weir et al, both speech and data are transmitted as packets over virtual connections set up in a fully digital network. A virtual connection is set up from a calling party to a called party at a call setup. Each packet contains source address, destination address, routing information of the switching network etc., in addition to payload and other network management information. Each packet stays intact while being transported through the network except for network management information and routing information. Each packet is transmitted through the network to the destination along the route specified in the routing information. Therefore, if the customer desires to send voice to a destination while data packets are being transmitted to a different destination over the same loop, the voice packet must interrupt the transmission of data packets because it requires minimum delay. The patent achieves this by adding a tail to the interrupted data packet and storing the remaining un-transmitted part of the data packet in a buffer. Like a data packet, a voice packet also contains addresses, routing information etc., but is 64 bytes long instead of 1024 bytes for a data packet. While the data packet is being interrupted, the voice packet must seize a channel in a synchronous TDM slot and is transmitted immediately when one is found. When the loop becomes available, the remaining part of the data in the buffer is sent as a separate packet containing addresses, routing information etc. In the patent, transmission is byte oriented and requires byte overheads because of channelized (timeslotted) design. As described above, packets are transported through a virtual connection from end to end. Therefore each packet must contain addresses, routing information, etc. The patent does not support multiple interruptions of a data packet. This means that the patent cannot guarantee delay of high priority packets. For example, if a link has a 16K packet to emit and is stopped after only 1 data byte is emitted in order to insert voice, 64 bytes of voice are now emitted and the remaining 15,999 bytes of data must then be played out, which will also delay any future voice packets. Because the patent limits the data packet to 1K and voice to 64 bytes, this may not be a problem for a loop circuit. However, in a high density network, this technique cannot be used without severe performance restrictions.

OBJECTS OF THE INVENTION

It is therefore an object of the present invention to provide a method and apparatus for transporting mixed traffic of different classes from one node to another over a single link.

It is another object of the present invention to provide a method and apparatus for transporting mixed traffic of different classes from one node to another over a single link in which one class of traffic can interrupt the emission of the other.

It is yet another object of the present invention to provide an integrated cell switching network which can handle connection oriented as well as connectionless packet switching of mixed traffic of different classes.

SUMMARY OF THE INVENTION

Briefly stated the present invention is directed to a digital telecommunication system for serially transmitting in packets of various sizes digital data of two or more different priorities from a source card to a destination card over a link. The system comprises the link connecting the cards, each of the cards having two or more buffers, each buffer being assigned with a priority for individually buffering packets of digital data according to their priority. A link controller serves the buffers for transmission of a packet buffered therein to the destination card according to their priorities so that a packet of one priority in its assigned buffer is able to interrupt the transmission of a packet of other priorities from their respectively assigned buffers and to fragment it to one or more packet fragments. The link controller adds to each of the packets and the fragments, a flag, priority bits, sequence bits, a complete bit and CRC bits.

According to another aspect, the present invention is directed to a method of serially transmitting in packets of various sizes digital data of two or more different priorities over a link from a source card to a destination card contained in a digital telecommunication system. The method comprises steps of individually buffering, at each card, packets of digital data according to their priority in two or more respectively assigned buffers, and serving the buffers at the source card for transmission of packets to the destination card according to their priorities so that a higher priority packet in a higher priority buffer interrupts at any time the transmission of a lower priority packet from a lower priority buffer by fragmenting the lower priority packet into one or more packet fragments. The method further includes a step of adding to each of the packets and the fragments, priority bits, sequence bits, and a complete bit to indicate respectively the priority, sequence number and completeness of each packet.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
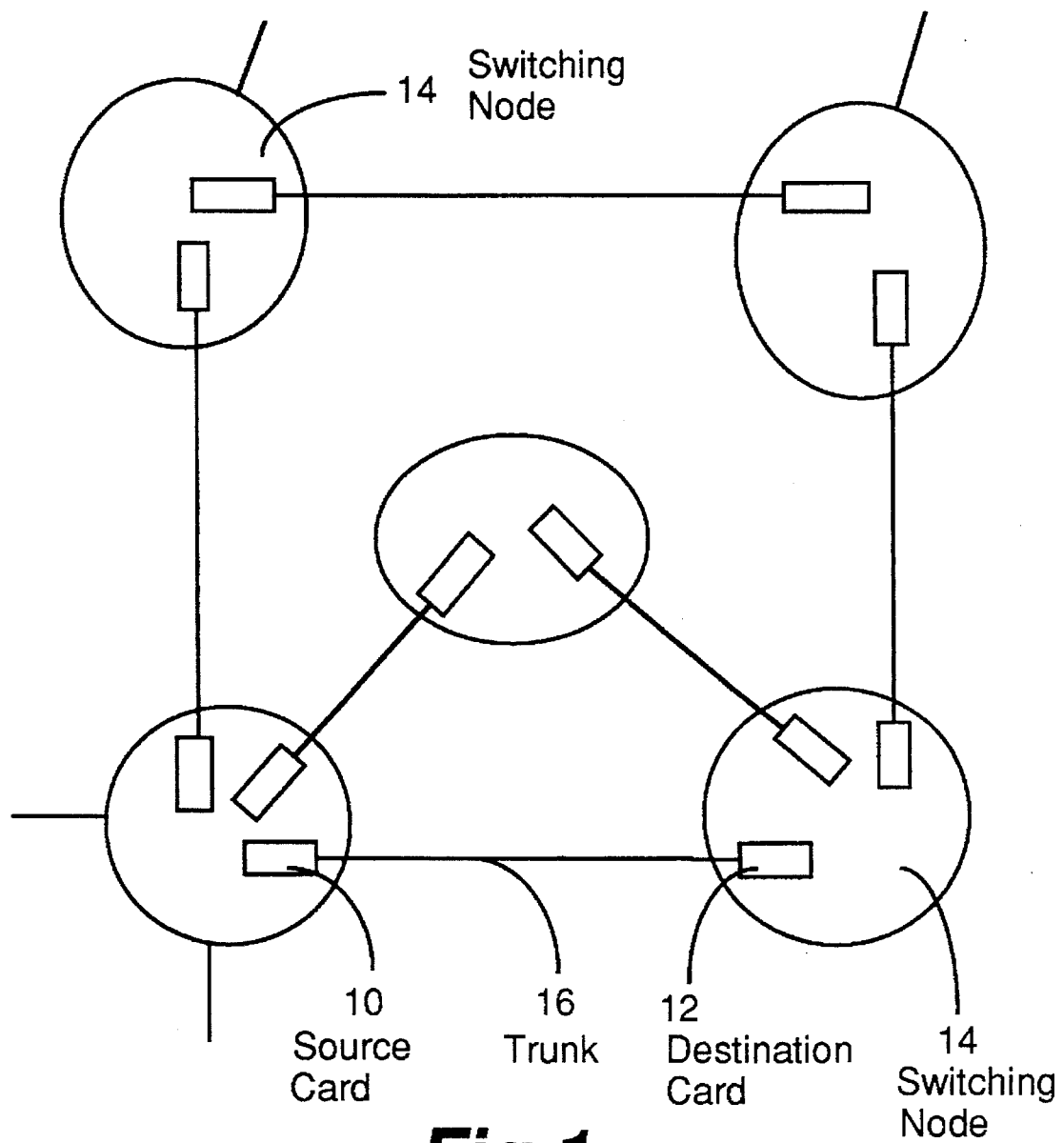
FIG. 1 is a schematic illustration of a telecommunication network in which links or trunks are shown to connect a switching node. The present invention is applied to the links.

FIG. 1 shows a schematic illustration of a typical network application using a novel link protocol which is designed to transport a payload from a source card 10 to a destination card 12 and which includes packet fragmentation capability. The network is formed by more than one switching node 14 connected by links or trunks 16. Switching (packet, circuit, cell etc.) takes place at each node 14 and is outside the protocol of the present invention. In the embodiment, mixed traffic such as, for example, voice and data is transported over a link in which voice traffic has higher priority over data traffic because of the shorter delay requirement. However, it should be noted that more than two classes of traffic can be handled, each having a differing priority based on other criteria or preferences than the delay requirement.

Figure 2:
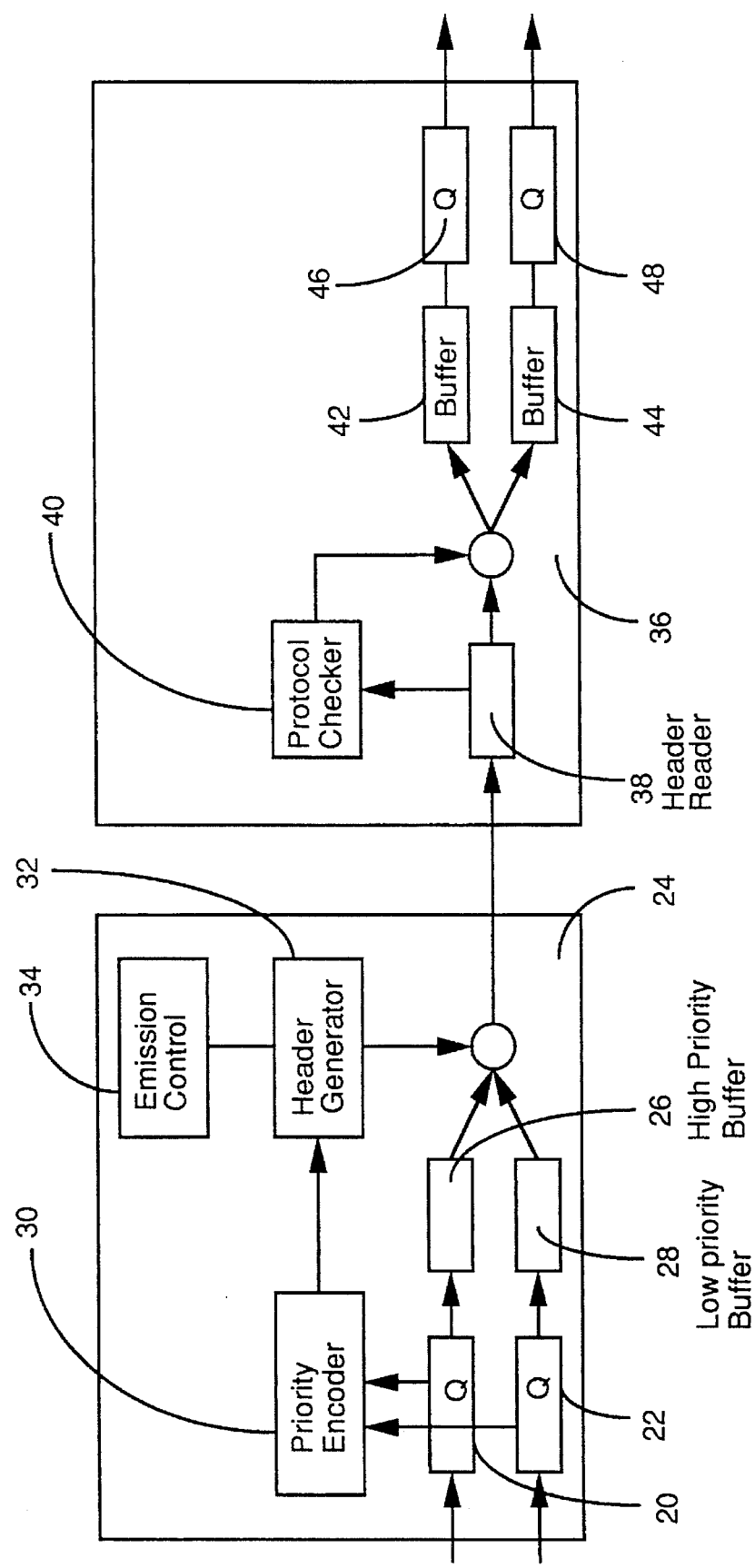
FIG. 2 is a schematic block diagram of a link connecting a source card and a destination card.

Referring to FIG. 2, two queues 20 and 22 are provided at the source card 24 on the left to store the packeted data to be transmitted. These queues are followed by buffers 26 and 28 which store packets or partially disassembled packets, as the case may be. The buffers 26 and 28 are serviced on a first come first served basis, however, the high priority buffer 26 is always serviced before the low priority buffer 28, in fact, the high priority buffer will pre-empt the low priority buffer whenever any high priority packets are waiting to be sent. A priority encoder 30 reads the priority of packets stored in the queues. Packets serviced out of the queues are first stored in respective buffers 26 and 28 waiting for a header and a tail to be appended. A header generator 32 receives priority indication from the priority encoder 30 and other information such as sequence number, flag, CRC etc. from the emission context 34 and attaches the header and tail to each packet. If no packets are queued to be sent, the flag delimiter is sent. In practice, the priority encoder 30, buffers 26 and 28, header generator 32 and emission context 34 are built into a custom ASIC.

The disassembly process begins when a low priority packet is temporarily suspended while a high priority packet is emitted. High priority packets will continue to be emitted as long as the high priority transmit buffer has data to send. When the high priority buffer is emptied, the low priority packet is restarted and the remainder of the low priority packet is sent. It is possible for a low priority packet to be interrupted as often as required and to be fragmented to any size, depending on the arrival of high priority packets at the transmit queue.

At the destination card 36, the received packets or fragmented packets are stripped off the header at a header reader 38. A protocol checker 40 monitors the priority and sequence number of the packets and directs them to their respective buffers 42 and 44 which are followed by queues 46 and 48. Low priority packets are assembled while high priority packets are simply queued. High priority packets are never fragmented, therefore they need not be assembled or disassembled.

Figure 3:
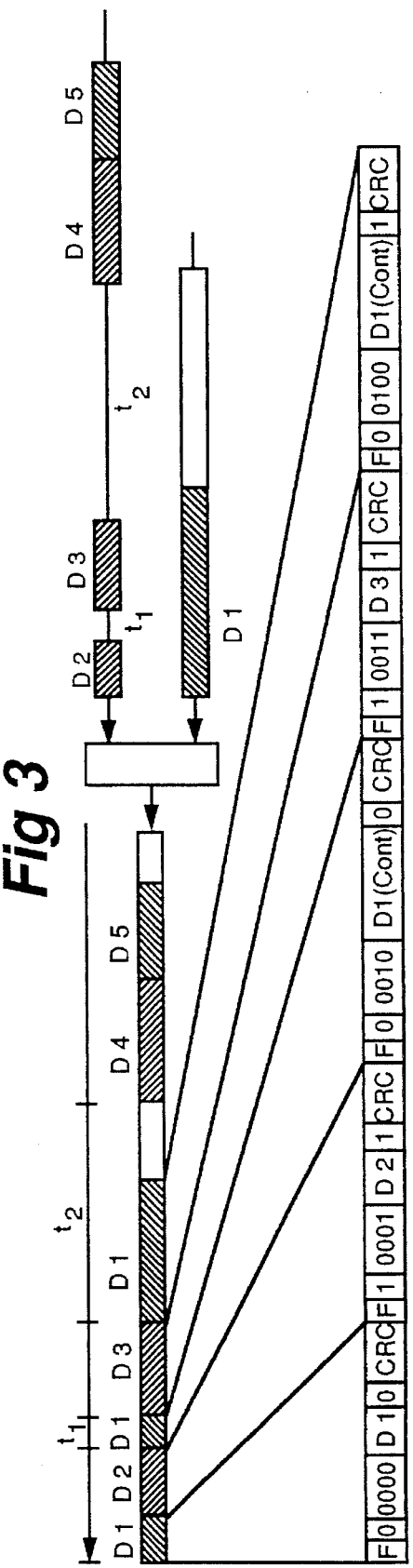
FIG. 3 is an illustration of data flow from buffers to a link.

FIG. 3 shows the form of the link data stream according to the present invention. Data is depicted as moving from right to left, that is, the bits on the left are emitted first. On the left, a low priority packet D1 has been started and then a high priority packet D2 interrupts it. The low priority packet is fragmented and its transmission is suspended until all high priority packets have been sent. Once the high priority packets have been sent, the low priority packet is resumed. However, another high priority packet D3 arrives at t1 after the end of D2 and thus it also interrupts D1. After D3, D1 is resumed until all the remaining packet fragments have been sent. Note that each fragment is delimited by a flag F.

Figure 4:
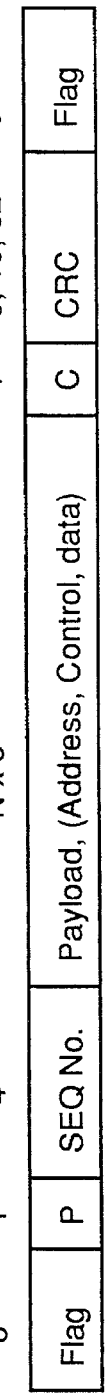
FIG. 4 is a protocol format according to one embodiment of the present invention.

FIG. 4 shows in detail the protocol according to one embodiment of the present invention. As mentioned earlier, this is a link protocol which is designed to transport a payload from a source card to a destination card. In this embodiment, the protocol defines a packet transport system with two delay classes. The format of the protocol is based on the HDLC format with the addition of a new 1-bit field (Priority) and 4-bit field (SEQuence) between the opening flag and the payload and a new 1-bit field (Complete) immediately before the CRC field. The first 1-bit field identifies the priority of the packet as HIGH (1) or LOW (0). The four-bit field identifies the sequence (SEQ) number. The one-bit field (C) added at the end of the payload indicates whether the packet is complete (1) or will be continued (0) in the subsequent packet. The above protocol in this embodiment supports two levels of priority (P). A low priority packet may be interrupted by one or more high priority packets; a high priority packet may not be interrupted. The complete bit (C) will always be set to one (1) for a high priority packet. It should of course be noted that any number of priority levels may be provided at the expense of hardware and software complexity. It should also be noted that the description thus far refers to the priority levels of traffic with respect to their delay sensitivity. However, traffic can be categorized according to other criteria and the priority field of the protocol can be used to treat certain traffic preferentially over others.

The sequence field (SEQ) contains a four-bit number, sent LSB first, whose value in each packet of high priority data or each packet fragment of low priority data should be one greater than the sequence number of the previous packet. The sequence number will roll over from 15 to 0. This sequence number is used to determine if packets are repeated or skipped whenever a high priority packet interrupts a low priority packet. Whenever a packet is repeated or skipped as indicated in SEQ, all low priority packets or packet fragments following the high priority packet will be discarded.

The packet fragmentation protocol of the present invention is bit oriented and can be used on any transparent link facility. Additionally, it is possible to use this protocol on DS1/E1 facilities where bit stuffing may be required to maintain the ones density. Zero bit insertion and deletion are applied outside the packet fragment protocol and as a result are transparent. The protocol of this invention allows delay sensitive packets to be routed with a predictable store and forward delay. Delay sensitive packets are emitted in preference to non-delay sensitive packets. The protocol provides error protection in the form of CRC and sequence numbers, incorrect fragments are marked as bad (stored in the block descriptor) and are discarded by software. In the worst case, the protocol overhead on the packet fragments is 46 bits per payload, excluding flag bits.

Figure 5:
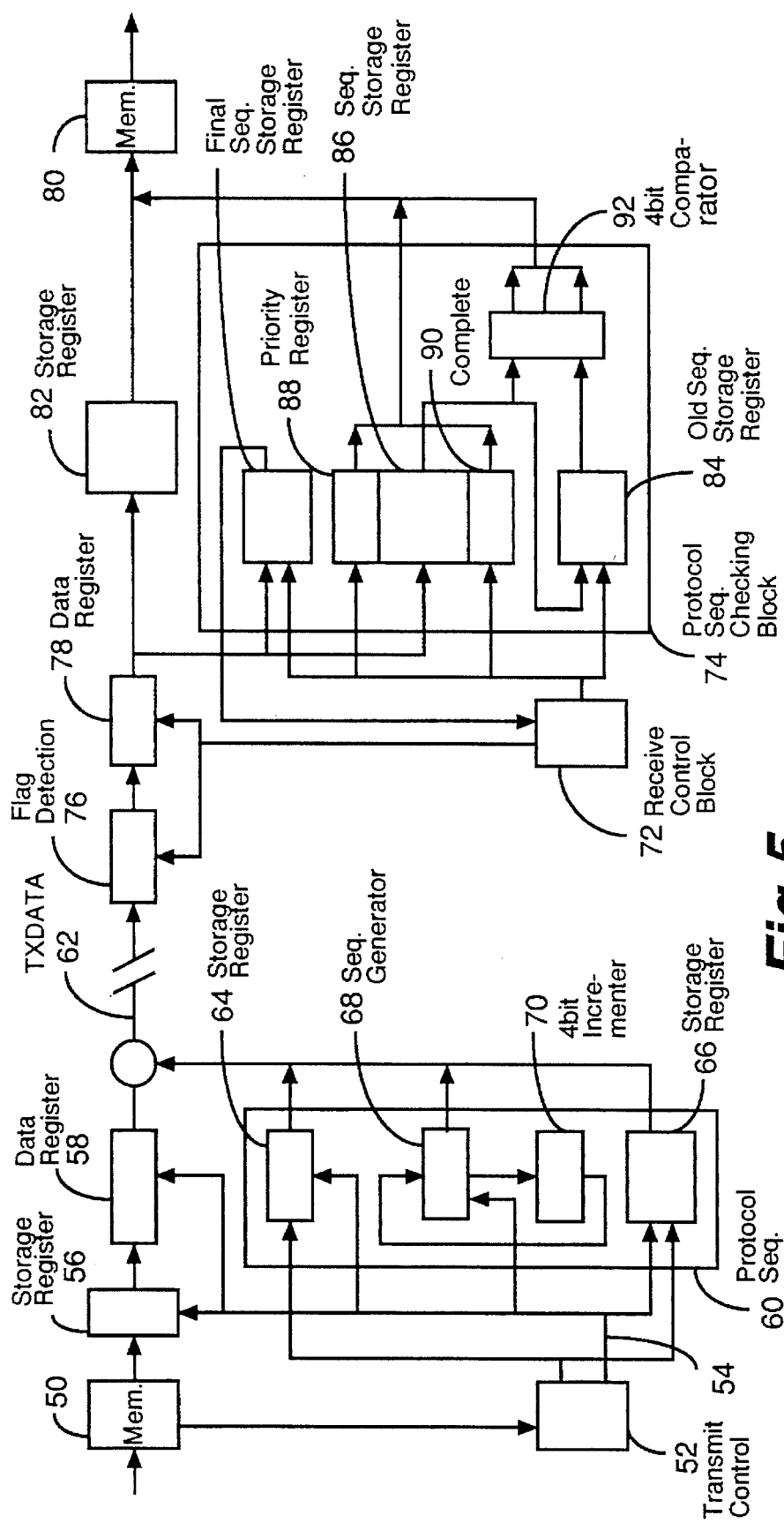
FIG. 5 shows in more detail the source and destination cards.

The source and destination cards are shown in detail in FIG. 5. The transmitter data path for the protocol generation according to one embodiment of the present invention is shown on the left. A memory 50 stores different categories (or priority) of data to be transmitted at different locations, that is to say, in the present embodiment the memory can be partitioned to a high priority queue and buffer for high priority data, and a low priority queue and buffer for low priority data. Of course, separate queues and buffers may be provided for different categories of data. A transmit control block 52 generates the timing, which signals by a line 54 a staging register 56 and data register 58 to properly align 8-bit words of payload data to transmit. The transmit control block 52 also signals a protocol/seq block 60 to insert the new bit fields (priority, sequence and complete fields) which have been described above into payload data at the appropriate time to form TXDATA 62. The protocol /seq block 60 consists of priority (P) and complete (C) 1-bit storage registers 64 and 66, sequence generator (SEQ) 68 which is a 4-bit parallel in/serial out storage register, and 4-bit incrementer 70. The transmit control block 52 receives the priority of payload data stored in the common memory 50 and sends it to the priority register 64. The sequence generator 68 and incrementer 70 count up and insert the sequence number of packets. The sequence number rolls over from 15 to 0.

As described earlier, immediately following transmission of the opening flag, the priority (P) and sequence (SEQ) bits are transmitted over TXDATA. The payload immediately follows this opening bit field provided via the data register 58. Whenever a low priority packet is interrupted, the complete (C) bit is set to 0, indicating the current packet has been interrupted and is incomplete.

The control and protocol/seq blocks are brought to a known state whenever the reset input is asserted. During reset, priority (P), complete (C) and sequence (SEQ) bits are set to 0. This is a synchronous circuit relative to CLK. Input priority and EOP (End-Of-Packet or Complete) are synchronously updated to the priority and complete storage registers. The combination of the sequence generator and incrementer generates the sequence number for each transmitted packet. The control block provides control via combinational logic and a finite state machine to properly insert the additional fields into the protocol.

FIG. 5 also shows the receive data path on the right. The receiver control block 72 generates the timing which signals the protocol/seq checking block 74 to extract the added bit fields from RXDATA at the appropriate time. Immediately following reception of the opening flag at flag detection 76 and data register 78, which are timed by the timing signal from the control block 72, the priority (P) and sequence (SEQ) bits are extracted from RXDATA and sent to the protocol /seq block 74. The payload immediately follows the opening P and SEQ bit fields and is diverted to the common memory 80 via the 8-bit staging register 82. The protocol bits are tested at protocol/seq block 74 for a priority change (P), an out of sequence error in the sequence field (SEQ), and an incomplete or interrupted packet indicated by the complete (C) field. The protocol/seq block 74 consists of 4-bit storage registers OLD SEQ 84 and SEQ 86, 1-bit storage registers for Priority 88 and Complete 90, and a 4-bit comparator 92.

The control and protocol/seq blocks are brought to a known state whenever the reset input is asserted. During reset, storage registers OLD SEQ 84, SEQ 86, Priority 88 and Complete 90 are set to 0. This is a synchronous circuit relative to CLK. The control block provides control via combinatorial logic and a finite state machine to properly extract the added fields from the input RXDATA. The comparator 92 determines if a packet has been skipped or repeated by monitoring the number in the SEQ field. This information will be stored for later processing.

Repeated Fragment

The protocol checker at the destination card detects repeated fragments whenever the sequence number of an arriving packet fragment is 1 to 4 smaller than expected. The checker discards all repeated packet fragments. When the packet fragment with the expected sequence number arrives, the checker passes the packet fragment to its respective buffer.

Skipped Fragment

The protocol checker detects skipped packet fragments whenever the sequence number of an arriving packet fragment is 1 to 4 greater than expected. If a skipped packet fragment is detected, the protocol checker will update its expected sequence number so that it equals the sequence number of the latest packet fragment that has arrived. The protocol checker will use the new sequence number when testing all subsequent packet fragments.

Whenever a skipped fragment error is indicated, the upper layer packet protocol should perform a packet level CRC check on the latest packets received. The packet level CRC is required in order to determine if the packet has lost data. Fragment level CRCs are insufficient for determining if a lost fragment has occurred. Note the high priority packets are entirely encapsulated within a fragment, therefore the fragment level CRC is equal to a packet level CRC (only for high priority packets).

Replicated or lost packet fragments can occur when using DS1/E1 facilities which use frame slips to adjust small differences between the receive and transmit clock frequencies. When a DS1 transmitter is sending data slightly faster than the receiver, overruns will occur. To prevent overruns, the transmitter periodically deletes a frame of 24 bytes (193 bits). The deletion of 24 bytes may cause the loss of entire packet fragments; this occurs if the fragment fits entirely within the 24 byte slip. Without sequence numbers, this loss would go undetected.

When a DS1 transmitter is sending data at a rate slightly less than that of the receiver, then the receiver would underrun. T1 facilities introduce an extra 24 byte frame of data to prevent underruns. The added frame is a replica of the previous frame, therefore there is a potential to replicate entire packet segments. The protocol sequence numbers detect fragment replication.

Based on a minimum payload size of three bytes (2 bytes of address and one byte of data) the minimum packet fragment size is 38 bits. This assumes that there is no CRC and that the interface does not perform zero stuffing. When a T1 frame is replicated, 193 bits are replicated and therefore there is the potential to replicate as many as 5 packet fragments (193 divided by 38). For the protocol to uniquely identify the replicated fragments, at least 11 sequence numbers are required (Nyquist criteria). An 11 state sequence number will prevent packets from aliasing due to the modulus counter wrapping. Given that the protocol of the present invention is bit oriented, the logical sequence number size has been selected as 16, which is the smallest binary sequence number greater than 11.

The packet fragment contains an octet aligned payload that is being sent from a source card to a destination card. The payload consists of a user packet which may include a software routing address. Leading bytes of the first fragment payload are used by the software routing system to route the user data. The length of the payload is an integer number of bytes. The protocol according to the present invention breaks the packet into octet aligned fragments that are actually transported in the payload field. The payload carried in a fragment may include the entire packet or some part of the packet, depending upon whether or not fragmentation has occurred. High emission priority packets always contain the entire user packet in the payload.

The delay that a particular packet fragment experiences is based on the packet length divided by the link speed. High emission priority packets should be length limited so that the emission delay does not exceed the maximum packet delay that is tolerable for high priority data.

Packets within the broadband network are of fixed or variable length. In order to maintain a reasonable switching delay for voice and video applications, two maximum packet sizes are used in the present invention. Voice and video packets will have a maximum packet size that ensures minimal switching and assembly delays, while data packets will have a larger maximum packet size reflecting their insensitivity to delay. The maximum packet size can be, for example, approximately 64 bytes for high priority data, and 16 Kbytes for low priority data. However, these numbers are examples only and in practice the maximum packet sizes are calculated based on link speed. Therefore, it is possible to use different packet sizes for different links among nodes in a network where some links are faster than others.

Voice delay is maintained by keeping the voice packet size small relative to the link speed. Interrupting low priority data packets effectively fragments the packet being transported, requiring the destination to reassemble packets. Fragmentation also introduces the potential for fragment mis-ordering. This undesirable characteristic is eliminated in the present invention by only allowing packets to be fragmented on a trunk or link. A single link acts like a first-in first-out buffer in which mis-ordering is not possible.

What is claimed is:

1. A digital telecommunication system for serially transmitting in packets of various sizes digital data of two or more different priorities from a source card to a destination card over a link, in transmitting the digital data the digital telecommunication system routinely using frame slips to adjust differences among clocks in the system, comprising:

the link connecting the cards;

each of the cards having two or more buffers and two or more queues, each queue and buffer being connected to each other and being assigned with a priority for individually storing packets or fragmented packets of digital data of any number of bytes according to their priority;

a link controller at the source card serving the buffers for transmission of a packet therein to the destination card according to their priorities so that a packet of higher priority in its assigned buffer is able to interrupt at any time the transmission of a packet of lower priority from its assigned buffer and to fragment it to one or more packet fragments of any number of bytes;

the link controller adding to each packet and fragmented packet, priority bits, sequence bits, CRC bits and a complete bit to indicate respectively the priority, sequence number, CRC, and completeness of each packet and fragmented packet; and a protocol checker at the destination card for monitoring the sequence numbers of packets for skipped or replicated packet fragments which may have been caused by the frame slips.

2. The digital telecommunication system according to claim 1, wherein the link controller comprises:

a priority encoder connected to the queues for reading the priority of packets stored therein;

a header generator for adding to each of the packets and the packet fragments a flag, priority bits, sequence bits, a complete bit and CRC bits; and a transmission control for coordinating the priority encoder and the header generator.

3. The digital telecommunication system according to claim 2 further comprising a common memory on each card which is properly partitioned to be used for the queues and buffers, each assigned to a different priority.

4. The digital telecommunication system according to claim 2 wherein a packet length is of any size within the respective maximum length for each priority, which maximum length is determined by the speed of the link.

5. In a digital telecommunication system, a method of serially transmitting in packets of various sizes, digital data of two or more different priorities from a source card to a destination card over a link, in transmitting the digital data the digital telecommunication system routinely using frame slips to adjust differences among clocks in the system, comprising steps of:

at each card, individually storing packets of digital data of any number of bytes according to their priority in two or more respectively assigned queues;

at each card, individually transferring from each queue and buffering packets of digital data of any number of bytes according to their priority in two or more respectively assigned buffers;

serving the buffers at the source card for transmission of packets according to their priorities so that a higher priority packet in a higher priority buffer interrupts at any time the transmission of a lower priority packet from a lower priority buffer by fragmenting the lower priority packet into one or more packet fragments of any number of bytes;

adding to each packet and packet fragment, priority bits, sequence bits, CRC bits, and a complete bit to indicate respectively the priority, sequence number, error check and completeness of each packet and fragmented packet;

receiving serially at the destination card packets transmitted over the link;

individually buffering received packets and packet fragments according to their priority at their respectively assigned buffers; and monitoring the sequence bits of the packet fragments for the correct sequence of the packet fragments and for skipped or replicated packet fragments which may have been caused by the frame slips.

6. The method of serially transmitting digital data according to claim 5, wherein the step of serving the buffers at the source card for transmission of a higher priority packet is performed whenever there is a packet to send in the respective buffer, thus interrupting the transmission of a lower priority packet each time a higher priority packet is transmitted and fragmenting it into one or more packet fragments of any size.

7. The method of serially transmitting digital data according to claim 6, further comprising a step of:

storing packets of digital data in respective queues according to their priority prior to the step of individual buffering.

* * * * *